United States Patent
Joo et al.

(10) Patent No.: US 8,542,259 B2
(45) Date of Patent: Sep. 24, 2013

(54) PRINTING MEDIUM, PRINTING METHOD, AND PRINTING APPARATUS USING PHOTONIC CRYSTAL CHARACTERISTIC

(75) Inventors: Jae Hyun Joo, Gyeonggi-do (KR); Sung Wan Hong, Gyeonggi-do (KR); Da Hyeon Go, Seoul (KR); Kwang Su Kim, Gyeonggi-do (KR)

(73) Assignee: Nanobrick Co., Ltd., Suwon (KR)

( * ) Notice: Subject to any disclaimer, the term of this patent is extended or adjusted under 35 U.S.C. 154(b) by 182 days.

(21) Appl. No.: 13/127,760

(22) PCT Filed: Aug. 5, 2010

(86) PCT No.: PCT/KR2010/005136
§ 371 (c)(1),
(2), (4) Date: Jul. 18, 2011

(87) PCT Pub. No.: WO2011/016681
PCT Pub. Date: Feb. 10, 2011

(65) Prior Publication Data
US 2011/0298880 A1  Dec. 8, 2011

(30) Foreign Application Priority Data
Aug. 5, 2009  (KR) .................. 10-2009-0072164

(51) Int. Cl.
*B41J 2/00*   (2006.01)
*B41J 2/06*   (2006.01)
*G02B 6/34*   (2006.01)
*G02B 6/10*   (2006.01)

(52) U.S. Cl.
USPC ............... 347/110; 347/55; 385/37; 385/129

(58) Field of Classification Search
None
See application file for complete search history.

(56) References Cited

U.S. PATENT DOCUMENTS

| | | | | |
|---|---|---|---|---|
| 5,357,274 A * | 10/1994 | Kitamura | | 347/55 |
| 6,329,453 B1 * | 12/2001 | Meinhardt et al. | | 524/210 |
| 2004/0170352 A1 * | 9/2004 | Summers et al. | | 385/16 |
| 2004/0170357 A1 * | 9/2004 | Takiguchi et al. | | 385/39 |
| 2008/0309857 A1 * | 12/2008 | Lee et al. | | 349/106 |
| 2009/0142018 A1 * | 6/2009 | Gomyo et al. | | 385/27 |

FOREIGN PATENT DOCUMENTS

KR  1020080004234 A  1/2008
KR  1020090076068 A  7/2009

OTHER PUBLICATIONS

Jun Hyuk Moon, et al; "Colloidal Engineering for Nano-Bio Fusion Research", Korean Chem. Eng. Res. Aug. 2008, vol. 46, No. 4, pp. 647-659.
Ki-Ra Lee, et al; "P)hotonic Crystals for Controlling the Light", NICE. 2005, vol. 23, No. 4, pp. 446-455.
International Search Report: mailed Mar. 2, 2011; PCT/KR2010/005136.

* cited by examiner

*Primary Examiner* — Stephen Meier
*Assistant Examiner* — Alexander C Witkowski

(57) ABSTRACT

The present invention provides a printing medium, a printing method, and a printing apparatus using a photonic crystal characteristic. According to the present invention, the printing medium using the photonic crystal characteristic comprises a medium in which a plurality of particles having electric charges are dispersed, wherein the inter-particle distances of the particles are controlled as a result of at least one of electric fields and magnetic fields are applied to the medium, and the inter-particle distances of the particles are fixed as the energy is applied to the medium.

43 Claims, 12 Drawing Sheets

110

(a)

(b)

(a)        (b)

(a)        (b)

(a)          (b)

(a)

(b)

(c)

1710    1720

1810    1820

PRINTING MEDIUM, PRINTING METHOD, AND PRINTING APPARATUS USING PHOTONIC CRYSTAL CHARACTERISTIC

CROSS-REFERENCE TO RELATED APPLICATIONS

This application claims the benefit of Korean Patent Application Nos. 10-2009-0072164 filed on Aug. 5, 2009 in the Korean Intellectual Property Office, the disclosures of which are incorporated herein in their entirety by reference.

FIELD OF THE INVENTION

The present invention relates to a printing medium, a printing method and a printing apparatus using a photonic crystal characteristic. More particularly, the present invention relates to a printing medium, a printing method and a printing apparatus using photonic crystal characteristics, which may control inter-particle distances of the particles in the medium by applying external stimulation such as electric field, magnetic field, etc. to the medium, and may decrease fluidity of the medium by applying energy or blocking the energy application to the medium, so as to fix the inter-particle distances of the particles in a controlled state, thereby stably embodying structural color in full color.

BACKGROUND OF THE INVENTION

A typical printing apparatus (that is, a printer) operates upon principle of mixing colored ink or toner particles and allowing the mixed particles to be adsorbed into a printing paper. Although conventional printers are widely used in many fields, they require different color inks and/or toners to express a variety of colors and entail difficulties in modifying or amending printed output (which was already obtained through printing).

In order to overcome restrictions of conventional printing technologies as described above, a number of studies and investigations have been implemented and various techniques have been introduced. A representative example of products resulted from such studies is 'electronic-ink.' Electronic ink is a coloring device to express specific colors by applying an electric field to a capsule containing different color particles (e.g., black and white) having negative charge (−) and positive charge (+), respectively, to thereby indicate various kinds of information including, for example, text. However, such an electronic ink entails difficulties in expressing a variety of colors, since the expressed color of the particles is fixed to a specific predetermined color.

Accordingly, in order to solve the problems of conventional technologies described above, numerous methods have been proposed and, among these, a technique based on a principle of photonic crystals may be employed.

Photonic crystal is a substance or crystal expressing color at a specific wavelength by reflecting light at the specific wavelength while passing light in other wavelengths. Representative examples of such photonic crystals may include the wings of butterfly, the shell of Cyphochilus, etc. These substances have unique structures, in turn expressing specific colors, although pigments are not contained therein.

According to recent research on photonic crystals, compared to existing photonic crystals present in nature that generally reflect light at specific wavelengths, artificially synthesized photonic crystals containing proper materials may modify a crystal structure (for example, interlayer thickness for formation of photonic crystals) by external stimulation. As a result, wavelengths of reflected light may be desirably controlled in the UV and infrared regions as well as in the visible light region.

The inventors of the present invention have conceived that a printing medium, printing method and/or printing apparatus using photonic crystal characteristics of reflecting light at specific wavelengths may be successfully embodied by applying an electric field or a magnetic field to particles with electric charge or magnetic properties to control inter-particle distances of the particles and then by applying energy or blocking the energy application to the medium to fix the inter-particle distances of the particles. The present invention has been completed based on the foregoing ideas.

SUMMARY OF THE INVENTION

It is an object of the present invention to provide a printing medium including numerous particles having electric charge or magnetic properties dispersed therein, characterized in that inter-particle distances of the particles in the medium may be controlled by applying external stimulation such as electric fields or magnetic fields to the medium and the inter-particle distances of the particles may be fixed by applying energy or blocking the energy application to the medium, to thereby stably embody structural color obtained by light reflection at specific wavelengths.

Another object of the present invention is to provide a printing method and a printing apparatus to print information in full color on a subject, on which the information is printed, including: injecting onto the subject a medium containing numerous particles having electric charge or magnetic properties dispersed therein; applying an electric field or a magnetic field to the medium to control inter-particle distances of the particles; and applying energy or blocking the energy application to the medium to fix the inter-particle distances of the particles.

In order to accomplish the above objects of the present invention, there is provided a printing medium using photonic crystal characteristics, including a medium containing numerous charged particles dispersed therein, wherein inter-particle distances of the particles in the medium are controlled by applying at least one of an electric field or a magnetic field to the medium; and wherein the inter-particle distances of the particles are fixed by applying energy to the medium.

The printing medium using photonic crystal characteristics according to the present invention may be a medium including numerous particles having electric charge (sometimes, referred to as "charged particles") dispersed therein, wherein inter-particle distances of the particles in the medium are controlled by applying energy as well as at least one of an electric field or a magnetic field to the medium; and wherein the inter-particle distances of the particles are fixed by blocking the energy application to the medium.

The foregoing medium may include at least one selected from reversible phase-change materials, reversible viscosity-change materials and irreversible curing materials.

The applied energy may include at least one selected from heat, light, electricity, magnetic energy, mechanical energy and chemical energy.

Depending upon variation in at least one of intensity or orientation of the electric field, inter-particle distances of the particles may be altered. Also, depending upon alterations of such inter-particle distances of the particles, the wavelength of light reflected from the particles may be varied.

Likewise, depending upon variation in at least one of intensity or orientation of the magnetic field, inter-particle distances of the particles may be altered. Also, depending upon alterations of such inter-particle distances of the particles, the wavelength of light reflected from the particles may be varied.

The particles may be electrically charged as such, or have electric charge by altering characteristics thereof.

The particles may comprise at least one selected from Fe, Co or Ni.

Fixation of the inter-particle distances of the particles may be released by re-applying only the energy to the medium.

The medium may be dispersed in a light transmittable material.

The printing medium using photonic crystal characteristics may further include a protective member formed on the medium to isolate the same from external environments.

The present invention also provides a printing method using photonic crystal characteristics, comprising: injecting a medium, in which numerous charged particles are dispersed; applying at least one of an electric field or a magnetic field to the medium to control inter-particle distances of the particles; and applying energy to the medium to fix the inter-particle distances of the particles.

The present invention provides an alternative printing method using photonic crystal characteristics, comprising: injecting a medium, in which numerous charged particles are dispersed; applying energy as well as at least one of an electric field or a magnetic field to the medium to control inter-particle distances of the particles; and blocking the energy application to the medium to fix the inter-particle distances of the particles.

The medium used herein may include at least one selected from reversible phase-change materials, reversible viscosity-change materials and irreversible curing materials.

The applied energy may include at least one selected from heat, light, electricity, magnetic energy, mechanical energy and chemical energy.

Depending upon variation in at least one of intensity or orientation of the electric field, inter-particle distances of the particles may be altered. Also, depending upon alterations of such inter-particle distances of the particles, the wavelength of light reflected from the particles may be varied.

Likewise, depending upon variation in at least one of intensity or orientation of the magnetic field, inter-particle distances of the particles may be altered. Also, depending upon alterations of such inter-particle distances of the particles, the wavelength of light reflected from the particles may be varied.

The particles may be electrically charged as such, or have electric charge by altering characteristics thereof.

The particles may comprise at least one selected from Fe, Co or Ni.

After the medium is adhered to a subject for printing, at least one of the electric field or magnetic field may be applied to the medium.

Meanwhile, the present invention provides a printing apparatus using photonic crystal characteristics, comprising: an injector to inject a medium, in which numerous charged particles are dispersed; an electromagnetic field generating and/or applying unit to generate and/or apply at least one of an electric field or a magnetic field to the medium; and an energy applying and/or controlling unit to apply and/or control energy to the medium, wherein at least one of the electric field and the magnetic field is applied to the medium to control inter-particle distances of the particles in the medium; and wherein the energy is applied to the medium using the applying and/or controlling unit to fix the inter-particle distances of the particles.

The present invention also provides an alternative printing apparatus using photonic crystal characteristics, comprising: an injector to inject a medium, in which numerous charged particles are dispersed; an electromagnetic field generating and/or applying unit to generate and/or apply at least one of an electric field or a magnetic field to the medium; and an energy applying and/or controlling unit to apply energy or block the energy application to the medium, wherein the energy as well as at least one of the electric field and the magnetic field are applied to the medium to control inter-particle distances of the particles; and wherein the energy applying and/or controlling unit blocks the application of energy to the medium to fix the inter-particle distances of the particles.

The energy applying and/or controlling unit may apply at least one selected from heat, light, electricity, magnetic energy, mechanical energy and chemical energy.

Depending upon variation in at least one of intensity or orientation of the electric field, inter-particle distances of the particles may be altered. Also, depending upon alterations of such inter-particle distances of the particles, the wavelength of light reflected from the particles may be varied.

Likewise, depending upon variation in at least one of intensity or orientation of the magnetic field, inter-particle distances of the particles may be altered. Also, depending upon alterations of such inter-particle distances of the particles, the wavelength of light reflected from the particles may be varied.

After the medium is adhered to a subject for printing, the electromagnetic field generating and/or applying unit may generate and/or apply at least one of the electric field and the magnetic field to the medium.

According to the present invention described above, the wavelength of light reflected from a printing medium may be controlled and fixed and, therefore, structural color in full color may be embodied on the printing medium without using alternative color inks containing pigments.

According to the present invention, the printing of structural color obtained by reflection of light at specific wavelengths onto a subject to be printed may be stably embodied, thus expressing various colors by a single substance without using a plurality of inks.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
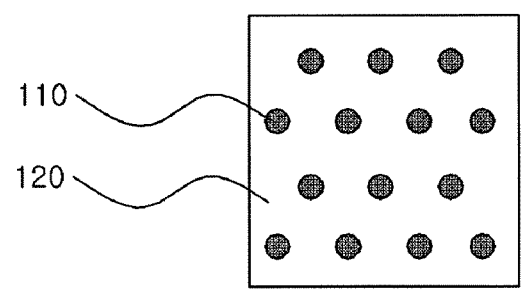
FIGS. 1 and 2 illustrate a configuration of particles contained in a printing medium according to an example embodiment of the present invention.

Preferred example embodiments of the present invention will be described in detail with reference to the following examples together with accompanying drawings. Such examples are sufficiently explained in details so that the skilled person to the art may clearly understand and easily embody the present invention. The example embodiments and examples described herein are different from one another, however, are to be construed as non-exclusive. For instance, specific shapes, configurations and/or characteristics described in the following example embodiments may also be embodied according to alternative example embodiments without departing from the scope and spirit of the present invention. Also, it will be understood that positions and/or arrangements of individual components described in the example embodiments may be altered or modified without departing from the scope and spirit of the present invention. Accordingly, the following detailed description is not to be construed as limiting the scope of the present invention, which is substantially defined by the appended claims and their equivalents. The same or similar reference numerals in the drawings denote elements having substantially the same configurations or performing similar functions and actions.

Hereinafter, in order to allow those skilled in the art to which the present invention pertains to clearly understand and/or easily embody the present invention, configurations of the present invention will be described in detail with reference to the accompanying drawings.

A printing medium, a printing method and a printing apparatus according to an example embodiment of the present invention may have a principle technical configuration of using photonic crystal characteristics, so as to stably embody structural color in full color.

Figure 2:
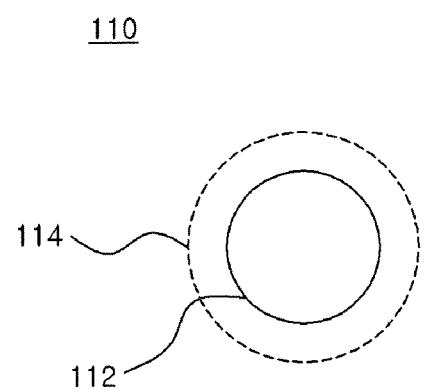

FIGS. 1 and 2 illustrate a configuration of particles contained in a printing medium according to an example embodiment of the present invention.

Referring to FIG. 1, particles 110 according to the example embodiment of the present invention may have electric charge (positive charge or negative charge) and be dispersed in a medium 120. Here, the particles 110 may be aligned at a predetermined inter-particle distances of the particles owing to inter-repulsive force. A diameter of each particle may range from several nanometers to several thousand nanometers, without being particularly limited thereto. According to a preferred example embodiment of the present invention, the particles 110 may exist in a colloidal state in the medium 120 and, hereinafter, are referred to as colloidal particles.

More particularly, according to an example embodiment of the present invention, charged particles may comprise a compound containing at least one selected from aluminum (Al), copper (Cu), silver (Ag), tin (Sn), titanium (Ti), tungsten (W), zirconium (Zr), zinc (Zn), silicon (Si), iron (Fe), nickel (Ni), cobalt (Co), and the like. The particles according to the example embodiment of the present invention may comprise a substance containing a polymer material such as polystyrene (PS), polyethylene (PE), polypropylene (PP), polyvinyl chloride (PVC), polyethylene terephthalate (PET), etc.

The particles according to an example embodiment of the present invention may comprise non-charged particles coated with a charged material. For example, there may be used particles coated with metal inorganic oxides such as silicon oxides $SiO_x$, titanium oxides $TiO_x$, etc.; particles coated with polymer materials such as PS, PE, PP, PVC, PET, ion-exchange resins, etc.; surface-processed (or coated) particles with organic compounds having hydrocarbon groups; surface-processed (or coated) particles with organic compounds having carboxylic acid, ester or acyl groups; surface-processed (coated) particles with complexes having halogen elements such as F, Cl, Br, I, etc.; surface-processed (coated) particles with coordination compounds containing amine, thiol, phosphine, etc.; particles charged by forming radicals on surface thereof, and so forth.

Referring to FIG. 2, the particle 110 according to an example embodiment of the present invention may comprise a cluster 112 having a plurality of nano-scale particles and a charge layer 114 enclosing the cluster 112.

According to an example embodiment of the present invention, the particles may include a magnetic substance, that is, oxides comprising Fe oxides, Ni oxides, Co oxides, etc., and thus having magnetic properties.

However, it is apparent that the configuration of the particles according to the present invention is not particularly limited to the foregoing and, instead, may be favorably modified in the range in which inter-particle distances of the particles can be controlled by, for example, an electric field or a magnetic field, provided that the purposes of the present invention may be accomplished.

According to the example embodiment of the present invention, when the electric field or magnetic field is applied to the colloidal particles, the colloidal particles may be under a specific electric force (or magnetic force) due to electric charge (or magnetic properties) of each colloidal particle. Accordingly, inter-particle distances of the colloidal particles are narrowed with the charged particles being biased in the direction of the field in the medium and the particles move closer to one another. At the same time, the colloidal particles having the same electrical polarity may be under repulsive force, so that the particles are repulsed against each other. As a result, depending upon relative intensity between electrical force by an electric field (or magnetic force by a magnetic field) and repulsive force between colloidal particles, inter-particle distances of the colloidal particles may be determined. Accordingly, colloidal particles aligned at predetermined inter-particle distances may function as photonic crystals. In other words, a wavelength of light reflected from colloidal particles is determined by a distance between the colloidal particles on the basis of Bragg rule and, therefore, when the distances between the colloidal particles are controlled, the wavelength of light reflected from the colloidal particles may be varied.

According to an example embodiment of the present invention, such colloidal particles may be dispersed in a medium. The medium used in the present invention may be a phase-changeable solvent or a curable solvent. Such phase-changeable solvent or curable solvent are solvents undergoing phase change and/or being cured, irreversibly or reversibly, by applying energy or blocking the energy application, wherein the energy may be selected from heat, light, electricity, magnetic energy, mechanical energy and chemical energy. More particularly, representative examples of the phase-changeable or curable solvent may include: a phase-changeable material being capable of changing from a solid state to a liquid state by increasing temperature; an UV curable material being capable of curing by UV irradiation; an electro-rheological material showing varied viscosity depending upon voltage; a magneto-rheological material showing varied viscosity depending upon magnetic field; a piezo-electrical material showing varied volume depending upon voltage; a material being capable of changing between sol and gel states depending upon chemical reaction, and the like.

More particularly, according to an example embodiment of the present invention, the phase-changeable solvent may include a phase-changeable material involving physical variation from one phase to another due to temperature change. For instance, the inventive phase-changeable solvent may include paraffin hydrocarbons having saturated hydrocarbon groups. The inventive phase-changeable solvent may also include paraffin compounds stabilized using, for example; ethylene glycol (EG), diethylene glycol (DEG), polyethylene glycol (PEG), polyethylene (PE), etc. The inventive phase-changeable solvent may also be hydrophilic-modified paraffin compounds obtained through substitution using carboxyl groups (—COOH), amine groups (—NH$_x$), sulphone groups (—SH), etc., in order to increase solubility of the solvent. In addition, the phase-changeable solvent may include salt hydrate-treated compounds. The phase-changeable solvent of the present invention may include ethylene compound or a compound having ethylene groups with a molecular weight of at least 1000 and high viscosity. Such compounds have high viscosity at a low temperature whereas they shows decreased viscosity at a relatively high temperature (more than 40° C.). The compounds show increase of solubility capable of making specific solutes dissolved therein as the temperature rises.

According to an example embodiment of the present invention, a curable solvent used herein may include a curable material involving chemical change when the material is irradiated with UV or visible light or a temperature is varied. For instance, the inventive curable solvent may include acrylate monomer radicals, acrylate monomers and acrylate adhesives with double carbon bonds, etc. The inventive curable solvent may also include an epoxy resin having ether bonds. The inventive curable solvent may also include urethane monomers and polyurethane adhesives with urethane bonds, etc.

According to an example embodiment of the present invention, a medium used herein may include an electro-rheological fluid (ERF) having viscosity varied by voltage. Here, ERF generally means a suspension in which micro-particles with high electrical polarizability are dispersed in an insulating fluid and of which rheological and mechanical properties are varied when a strong electric field is applied thereto. Using ERF, motion of such microparticles in the medium may be simply controlled by applying an electric field (without requiring alternative motion devices). As a result, design simplification of a display apparatus may be achieved. Contrary to known Newtonian fluids, dispersed particles are aligned as a chain structure inside the ERF along the direction of the electric field applied to the ERF, thus exhibiting behavior of Bingham plastic fluid having rapidly increased viscosity. Such ERF may enable control of viscosity of the fluid based on the electric field applied thereto. Specifically, according to an example embodiment of the present invention, when magnetic particles, inter-particle distances of which are regulated through application of a magnetic field, are dispersed in an ERF and an electric field is applied to the ERF, a viscosity of the ERF is rapidly increased to thereby effectively maintain or fix the inter-particle distances of magnetic particles which were predetermined and controlled by the applied magnetic field.

According to an example embodiment of the present invention, a medium used herein may include a magneto-rheological fluid (MRF) having viscosity varied by magnetic field strength. Here, MRF generally means a suspension in which microparticles having high magnetic polarizability are dispersed in a non-magnetic fluid and of which rheological and mechanical properties are varied when a strong magnetic field is applied thereto. Using MRF, motion of such microparticles in the medium may be simply controlled by applying a magnetic field thereto (without requiring alternative motion devices). As a result, design simplification of a display apparatus may be achieved. The MRF may also exhibit early response to the magnetic field and reversible effects of rheological properties. Specifically, according to an example embodiment of the present invention, when charged particles, inter-particle distances of which are regulated through application of an electric field, are dispersed in an MRF and a magnetic field is applied to the MRF, a viscosity of the MRF is rapidly increased to thereby effectively maintain or fix the inter-particle distances of charged particles which were predetermined and controlled by the applied electric field.

According to an example embodiment of the present invention, a medium used herein may include a material having piezoelectric properties. In particular, according to an example embodiment of the present invention, when a piezoelectric material is contained in the medium and the electric field is applied to the medium, the volume of the piezoelectric material change and thus movement of particles may be directly or indirectly limited. As a result, inter-particle distances of the particles predetermined and controlled by an electric field or a magnetic field, may be effectively maintained or fixed. On the contrary, according to another example embodiment of the present invention, when a piezoelectric material is contained in the medium and the mechanical energy such as pressure is applied to a medium, electrical properties of the piezoelectric material contained in the medium are altered and thus movement of particles may be directly or indirectly limited. As a result, inter-particle distances of the particles predetermined and controlled by an electric field or a magnetic field, may be effectively maintained or fixed.

More particularly, according to an example embodiment of the present invention, a medium used herein may include a phase-changeable material from a sol to a gel or, reversibly, from a gel to a sol, depending upon chemical reaction. That is, according to an exemplary embodiment of the present invention, the inter-particle distances of the particles, which were predetermined and controlled by an electric field or a magnetic field, may be effectively maintained or fixed by introducing a phase change inducing material to a medium containing a so-gel phase change material, thus inducing phase change of a solvent into the sol state or gel state.

However, the medium used in the present invention is not particularly restricted to the foregoing and may be suitably altered or modified without departing from the scope of the present invention to accomplish purposes of the present invention, that is, provided that fluidity of a medium may be varied by applying energy such as heat, light, electricity, magnetic energy, mechanical energy, chemical energy, etc. or blocking application of such energy.

Hereinafter, the following example embodiments will be given to generally explain use of heat or light, for illustrative purposes, in order to control states of a medium. However, the energy used herein is not particularly limited to heat or light but should be construed as an overall concept of energy capable of varying fluidity of the medium, including; heat, light, electricity, magnetic energy, mechanical energy, chemical energy, and so forth.

According to an example embodiment of the present invention, after controlling the inter-particle distances of colloidal particles by applying a magnetic field or an electric field to the colloidal particles, which are dispersed in a fluid medium, the medium may be changed from a fluid state (e.g., a liquid phase) to a fixed state (e.g., a solid phase) by applying energy or blocking the energy application. Accordingly, the controlled inter-particle distances of the particles become fixed in the medium changed into the fixed state. Alternatively, according to another example embodiment of the present invention, the medium may be changed from a fixed state to a fluid state by applying energy or blocking the energy application, thus releasing fixation of the inter-particle distances of the colloidal particles in the medium.

In other words, by aligning colloidal particles in a medium and fixing the same at predetermined inter-particle distances of the particles, a predetermined wavelength of light reflected from the colloidal particles may be continuously maintained. On the contrary, by releasing alignment of colloidal particles fixed at predetermined inter-particle distances of the particles, the inter-particle distances may be returned to a condition capable of being controlled by an electric field or a magnetic field.

Figure 3:
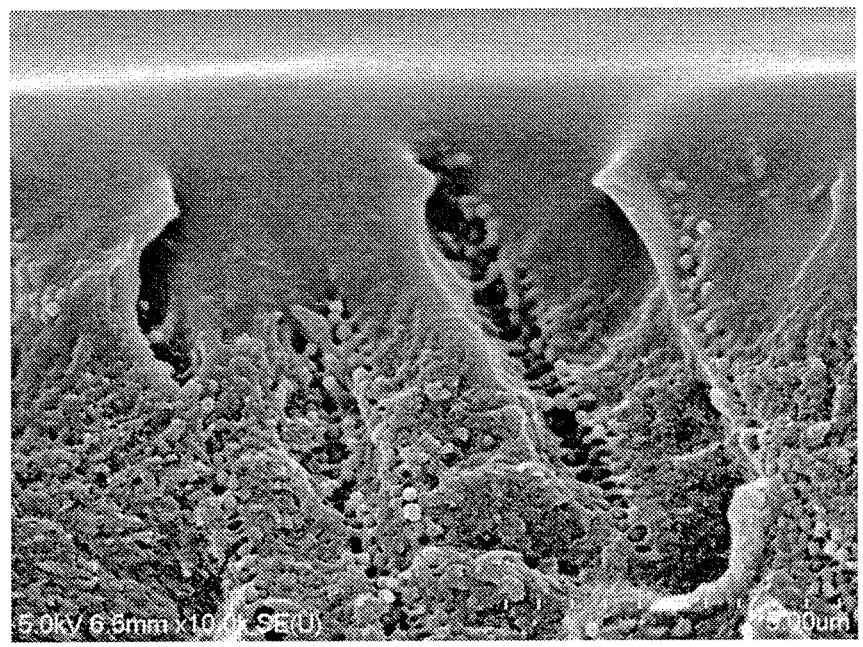
FIGS. 3 and 4 illustrate a configuration of a medium having particles dispersed therein according to an example embodiment of the present invention.

FIG. 3 illustrates a configuration of a medium having particles dispersed therein according to an example embodiment of the present invention. For reference, FIG. 3 is an electron micrograph of a cross section of a medium.

Referring to FIG. 3, colloidal particles may be uniformly mixed in a medium, thus forming a dispersion of colloidal particles in the medium. According to an exemplary example embodiment of the present invention, the colloidal particles may be an $FeO_x$ cluster coated with a charge layer and the medium may contain a UV curable material. As shown in FIG. 3, the colloidal particles dispersed in the medium may be aligned at predetermined inter-particle distances by an electric field or a magnetic field, wherein the medium containing the UV curable material is cured by UV application, and hence the positions of the colloidal particles aligned at the predetermined inter-particle distances by the electric field or the magnetic field may be fixed. Consequently, even after the applied electric field or magnetic field is blocked or removed, a structural color exhibited by the arrangement of colloidal particles may be continuously maintained.

Figure 4:
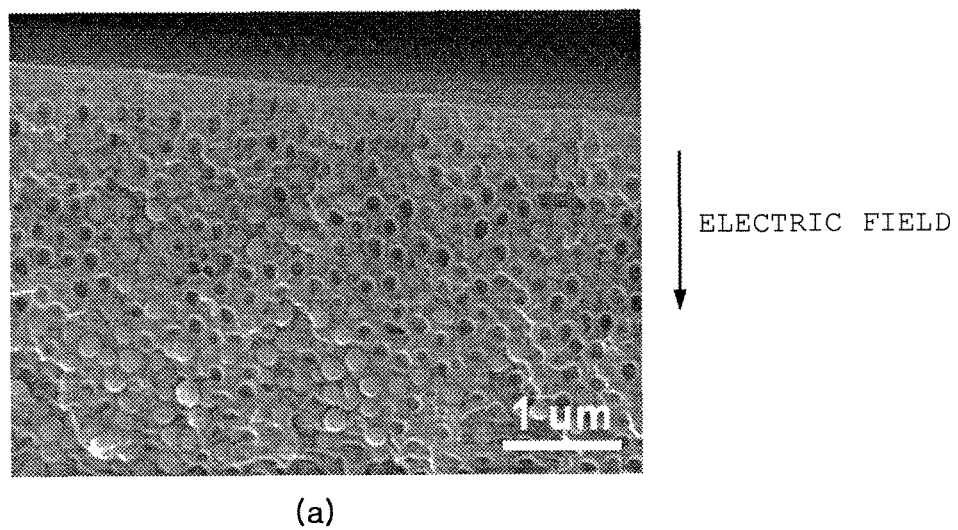
Figure 4:
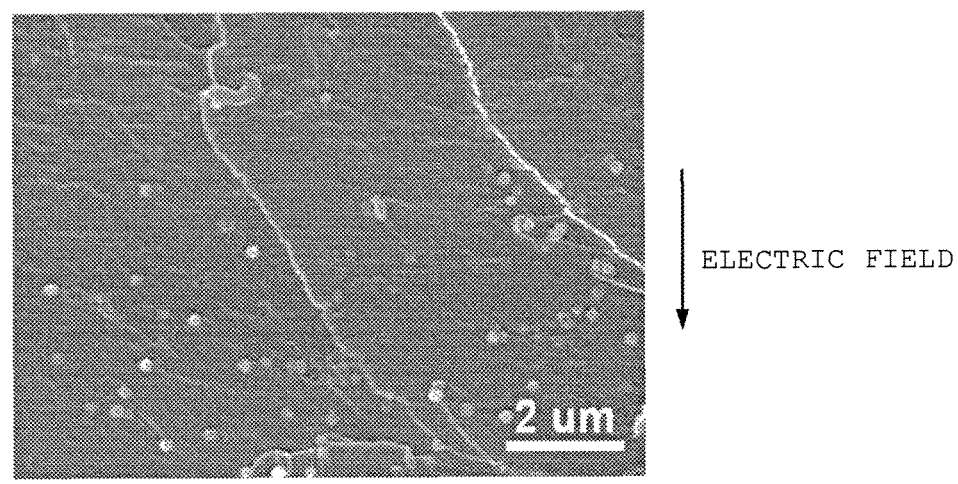

FIG. 4 illustrates a configuration of a medium having particles dispersed therein according to an example embodiment of the present invention. For reference, FIG. 4 is an electron micrograph of a cross section of a medium.

Referring to FIG. 4, colloidal particles may be uniformly mixed in a medium, thus forming a dispersion of colloidal particles in the medium. According to an exemplary example embodiment of the present invention, the colloidal particles may be an $FeO_x$ cluster coated with a charge layer and the medium may contain a UV curable material. As shown in FIG. 4, the colloidal particles dispersed in the medium may be aligned at predetermined inter-particle distances by an electric field applied using upper and lower electrodes, wherein the medium containing the UV curable material is cured by UV application, and thus the positions of the colloidal particles aligned at the predetermined inter-particle distances by the electric field may be fixed. Consequently, even after the applied electric field is blocked or removed, a structural color exhibited by the alignment of colloidal particles may be continuously maintained. More particularly, according to the example embodiment illustrated in FIG. 4, the colloidal particles having negative charge are introduced between a (+) electrode and a (−) electrode (that is, upper and lower electrodes, respectively) in a dispersed state in the medium. Referring to FIG. 4, it can be seen that the electric field applied using the upper and lower electrodes enables the colloidal particles to move toward the upper (that is, (+)) electrode and be regularly aligned (see FIG. 4A), while only a limited number of colloidal particles are dispersed at the lower (that is, (−)) electrode (see FIG. 4B).

The following example embodiments will be described in detail when the inventive medium is a phase-changeable solvent or a curable solvent. However, the present invention is not particularly limited to the foregoing. Briefly, it is considered that both the phase-changeable solvent and the curable solvent may be used as a medium in the following example embodiments of the present invention, provided that these solvents may accomplish the purposes of the present invention.

Also, although the following example embodiments illustrate use of colloidal particles, particles used in the present invention are not particularly limited thereto. That is, in all example embodiments of the present invention described below, alternative types of particles other than the colloidal particles may also be adopted, provided that these particles may accomplish the purposes of the present invention.

Figure 5:
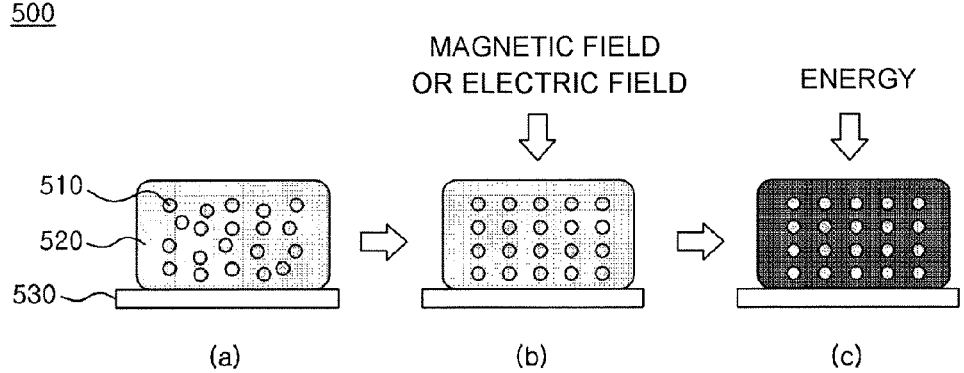
FIG. 5 illustrates a configuration of a printing medium according to another example embodiment of the present invention.

FIG. 5 illustrates a configuration of a printing medium according to another example embodiment of the present invention.

Referring to FIG. 5, a printing medium 500 according to the example embodiment of the present invention may include colloidal particles 510, a medium 520 containing the colloidal particles 510 dispersed therein, and a substrate 530. In this regard, the medium 520 may comprise a material irreversibly cured by application of energy. For instance, the medium 520 may include a material rigidly cured by UV irradiation (or, applying light energy), which corresponds to the foregoing curable solvent.

With reference to FIG. 5, a process of rendering a stable structural color of the printing medium 500 according to an example embodiment of the present invention will be described hereinafter.

First, according to an exemplary example embodiment of the present invention, the colloidal particles 510 may be randomly dispersed in a fluid medium 520 and freely movable by external stimulation such as an electric field, a magnetic field, etc. (See (a) of FIG. 5). Next, according to the exemplary example embodiment of the present invention, the electric field or the magnetic field may be applied to the colloidal particles 510 to control inter-particle distances of the particles and obtain predetermined inter-particle distances (See (b) of FIG. 5). Then, according to the exemplary example embodiment of the present invention, after the predetermined inter-particle distances of the colloidal particles 510 are suitably established, heat, light, electricity, magnetic energy, mechanical energy and/or chemical energy is applied to the medium 520, so as to change the medium from a fluid state into a fixed state (for example, into a cured state), thereby enabling the established and predetermined inter-particle distances to be fixed in the medium 520 (See (c) of FIG. 5).

Consequently, according to the exemplary example embodiment of the present invention, even if the electric field or the magnetic field is not continuously applied to a printing medium 500 to maintain the established inter-particle distances of the particles, light at a specific wavelength is continuously reflected back from a specific region of the printing medium 500, resulting in continuous displaying of the color corresponding to the specific wavelength without the application of the field.

Figure 6:
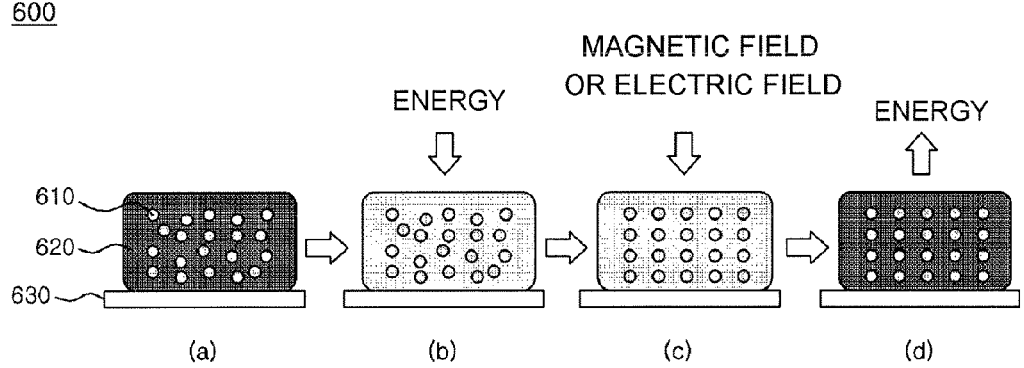
FIG. 6 illustrates a configuration of a printing medium according to another example embodiment of the present invention.

FIG. 6 illustrates a configuration of a printing medium according to another example embodiment of the present invention.

Referring to FIG. 6, a printing medium 600 according to the example embodiment of the present invention may include colloidal particles 610, a medium 620 containing the colloidal particles 610 dispersed therein, and a substrate 630. In this regard, the medium 620 may comprise a reversible phase-change material. For example, the medium 620 may include a material which changes from a solid state to a liquid state, and then, returns to the solid state by increasing/decreasing a temperature (that is, application of heat energy in increasing/decreasing manner). Moreover, the medium may include an electro-rheological or magneto-rheological material having viscosity varied depending upon the electric field or the magnetic field applied thereto.

With reference to FIG. 6, a process of rendering a stable structural color of the printing medium 600 according to an example embodiment of the present invention will be described hereinafter.

First, according to an exemplary example embodiment of the present invention, the colloidal particles 610 may be randomly dispersed in a medium 620 present in a fixed state (e.g., in a state of solid, gel, etc.) and may be immobile by external stimulation such as an electric field or a magnetic field (See (a) of FIG. 6). Next, according to the exemplary example embodiment of the present invention, heat, light, electricity, magnetic energy, mechanical energy and/or chemical energy is applied to the medium 620, so as to implement phase-change of the medium from the fixed state into a fluid state (e.g., into a state of liquid, sol, etc.), thereby enabling the colloidal particles 610 dispersed in the medium 620 to be movable by the external stimulation such as the electric field or the magnetic field (See (b) of FIG. 6). Following this, according to the exemplary example embodiment of the present invention, the electric field or the magnetic field may be applied to the colloidal particles 610, and thus a predetermined inter-particle distance of the colloidal particles 610 is established (See (c) of FIG. 6). Thereafter, according to the exemplary example embodiment of the present invention, the application of heat, light, electricity, magnetic energy, mechanical energy and/or chemical energy to the medium 620 may be blocked while the predetermined inter-particle distance of the colloidal particles 610 is established, thereby enabling the predetermined and established inter-particle distances to be fixed in the medium 620 (See (d) of FIG. 6).

Consequently, according to the exemplary example embodiment of the present invention, even if the electric field or the magnetic field is not continuously applied to a printing medium 600 to maintain the established inter-particle distances of the particles, light at a specific wavelength is continuously reflected back from a specific region of the printing medium 600, resulting in continuous displaying of the color corresponding to the specific wavelength without the application of the field. Furthermore, according to another example embodiment of the present invention, using a reversible phase-change material may embody a rewritable printing medium (enabling repetitive writing and deleting).

According to another example embodiment of the present invention, solvents containing colloidal particles dispersed therein may be encapsulated in various types of capsules made of light transmittable substances.

Figure 7:
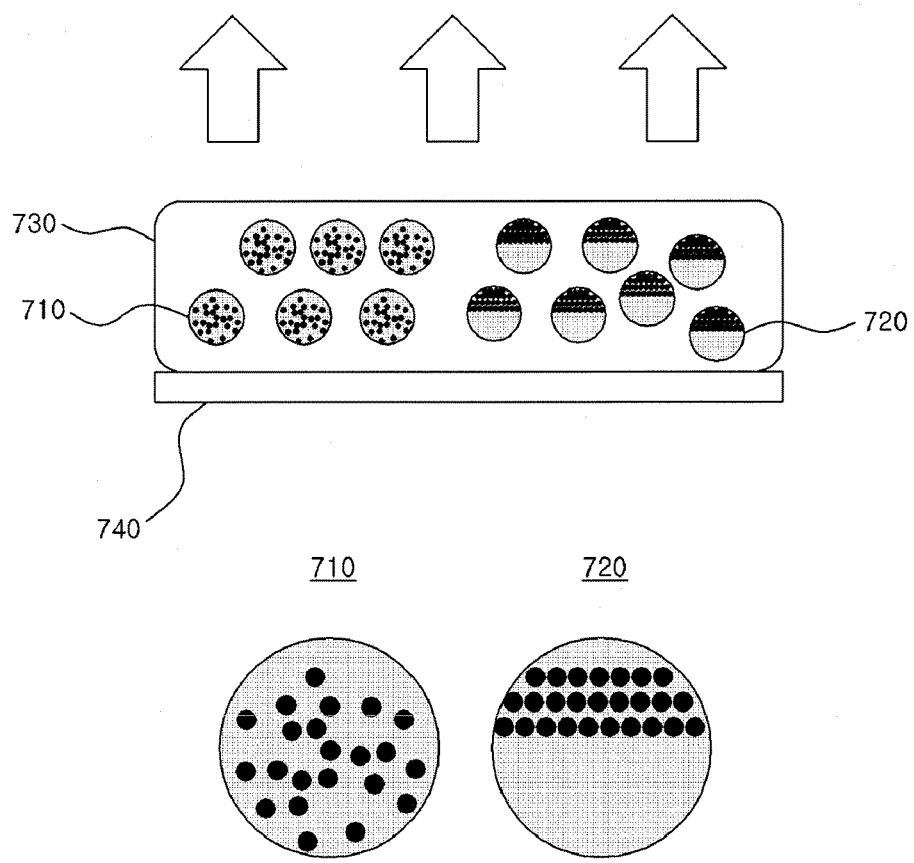
FIG. 7 illustrates a configuration of a printing medium made of colloidal particle-containing mediums dispersed in a light transmittable material (in a droplet type) according to an example embodiment of the present invention.

FIG. 7 illustrates a configuration of a printing medium made of colloidal particle-containing mediums dispersed in a light transmittable material (in a droplet type) according to an example embodiment of the present invention.

Referring to FIG. 7, particles-containing mediums of a printing medium 700 according to the example embodiment of the present invention may be dispersed in a light transmittable material 730 in a dispersed state (that is, in a colloidal phase). More particularly, mediums containing a predetermined amount of colloidal particles may be dispersed in a droplet form in the light transmittable material 730, which is immobile by external stimulation such as an electric field or a magnetic field, thereby isolating some portion of colloidal particles from other portions of colloidal particles. That is, according to the example embodiment of the present invention, by dispersing colloidal particle-dispersed mediums in the light transmittable material 730, it is possible to prevent direct/indirect interference between the colloidal particles in different medium regions 710 and 720, e.g., miscibility between the colloidal particles in the different medium regions 710 and 720. Moreover, inter-particle distances of colloidal particles in the printing medium 700 may be independently controlled on a basis of colloidal particle-dispersed mediums in the light transmittable material 730.

Following this, referring to FIG. 7, the printing medium 700 according to the example embodiment of the present invention may have a plurality of medium regions 710 and 720 present in the light transmittable material 730. More particularly, inter-particle distances of colloidal particles in the first medium region 710 to which a first magnetic field is applied, and inter-particle distances of colloidal particles in the second medium region 720 to which a second magnetic field is applied, may be independently controlled. Consequently, the first medium region 710 and the second medium region 720 may reflect lights at different wavelengths, respectively.

Figure 8:
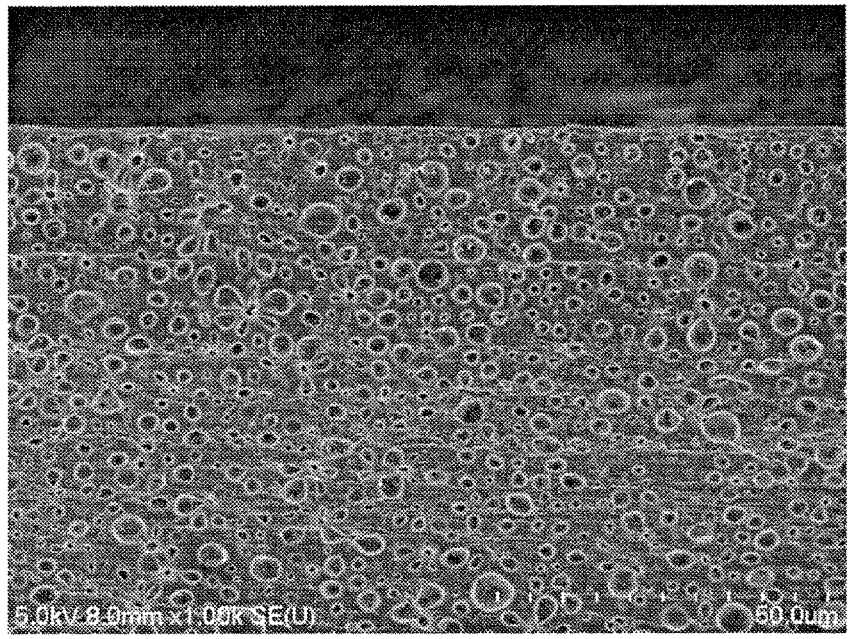
FIGS. 8 and 9 illustrate a configuration of colloidal particles dispersed in a light transmittable material according to an example embodiment of the present invention.
Figure 9:
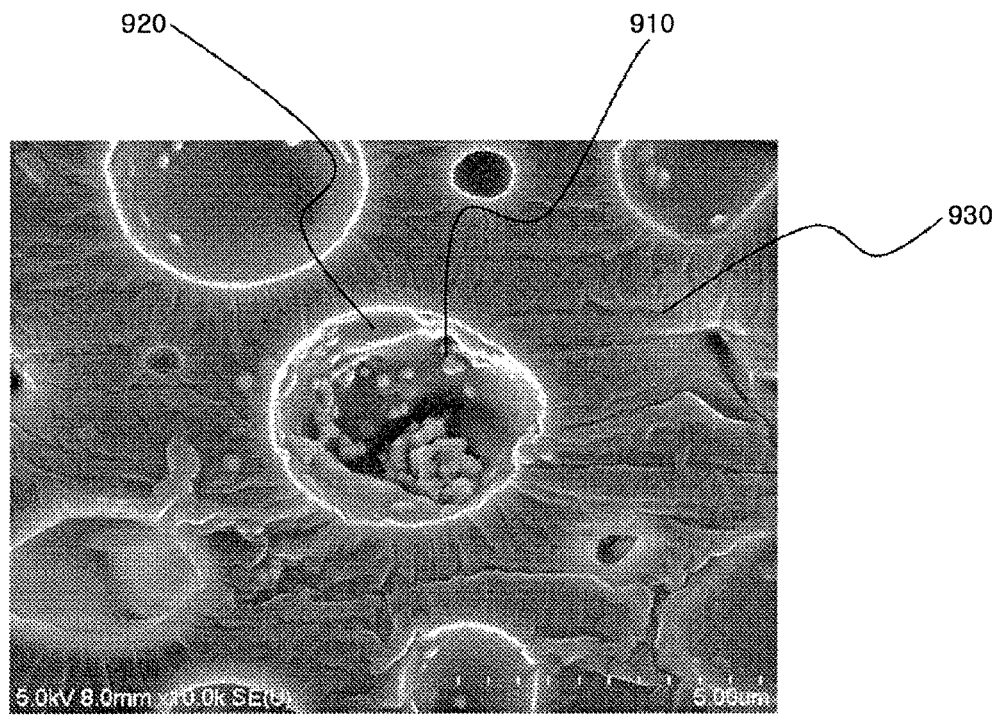

FIGS. 8 and 9 illustrate a practical example of colloidal particles dispersed in a light transmittable material according to another example embodiment of the present invention. For reference, FIGS. 8 and 9 are electron micrographs showing a cross section of the printing medium 700 shown in FIG. 7.

Referring to FIGS. 8 and 9, it can be seen that colloidal particles 910 are dispersed in mediums 920 and the mediums 920 are dispersed in the light transmittable material 930 present in a solid or gel phase, which is immobile by external stimulation such as an electric field or a magnetic field. More particularly, according to the example embodiment of the present invention, after preparing emulsion type mediums 920 in which colloidal particles 910 having electric charge or magnetic properties are dispersed, the prepared mediums 920 may be treated into a droplet form and be uniformly mixed in the light transmittable material 930. According to another example embodiment of the present invention, the colloidal particles 910 may comprise an $FeO_x$ cluster coated with a charge layer, the mediums 920 may comprise UV curable materials, and the light transmittable material 930 may comprise polydimethylsiloxane (PDMS).

Figure 10:
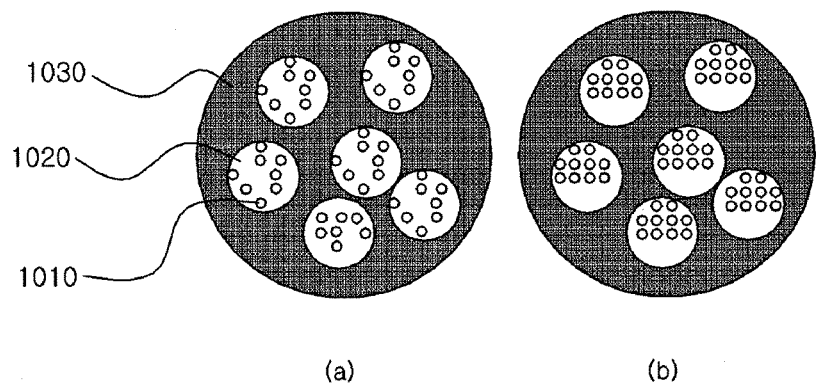
FIG. 10 illustrates a configuration of capsules (sponge type capsules) made of colloidal particle-containing mediums mixed with a light transmittable material in an encapsulating manner according to an example embodiment of the present invention.

FIG. 10 illustrates a configuration of capsules (sponge type capsules) made of colloidal particle-containing mediums mixed with a light transmittable material in an encapsulating manner according to an example embodiment of the present invention.

Referring to FIG. 10, mediums 1020 containing colloidal particles 1010 dispersed therein according to an example embodiment of the present invention may be dispersed in a capsule (e.g., a spherical capsule) made of a light transmittable material 1030. More particularly, according to an exemplary example embodiment of the present invention, the emulsion type mediums 1020 in which colloidal particles 1010 having electric charge or magnetic properties are dispersed, may be prepared, followed by uniformly mixing the same with the light transmittable material 1030, to thereby form the capsule (e.g., a sponge type capsule) comprising the mediums 1020 in which the colloidal particles 1010 are dispersed.

Figure 11:
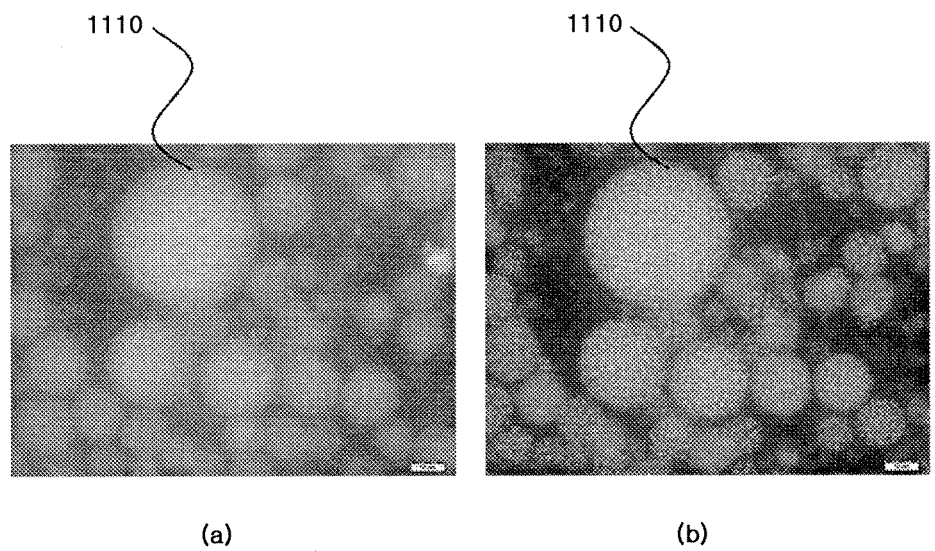
FIG. 11 illustrates a practical example of a capsule including a colloidal particle-containing medium dispersed therein according to an example embodiment of the present invention.

FIG. 11 illustrates a practical example of a capsule including colloidal particle-containing mediums dispersed therein according to an example embodiment of the present invention. Referring to FIG. 11, it can be seen that, when an electric field or a magnetic field is not applied (See (a) of FIG. 11), the colloidal particles 1010 present in the capsule are randomly dispersed therein. On the other hand, when the electric field or the magnetic field is applied (See (b) of FIG. 11), the colloidal particles 1010 present in the capsule are regularly aligned at predetermined inter-particle distances, thus reflecting light at a specific wavelength. According to an exemplary example embodiment of the present invention, the colloidal particles may comprise an $FeO_x$ cluster coated with a charge layer, the mediums may comprise UV curable materials, and the light transmittable material may comprise PDMS.

Figure 12:
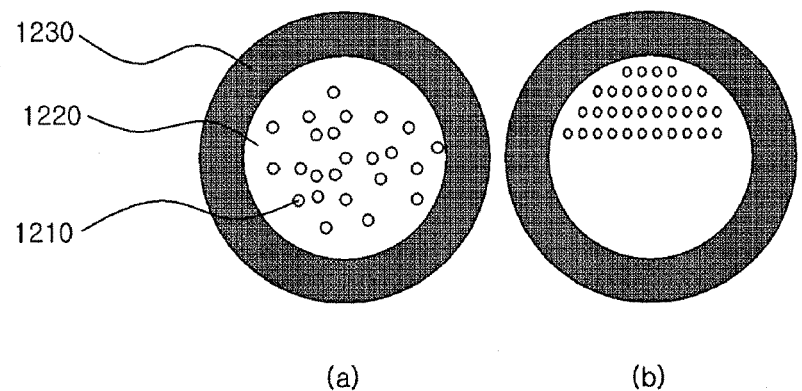
FIG. 12 illustrates a configuration of a capsule (a shell type capsule) of a colloidal particle-containing medium coated by a coating film made of a light transmittable material in an encapsulating manner according to an example embodiment of the present invention.

FIG. 12 illustrates a configuration of a capsule (a shell type capsule) of a colloidal particle-containing medium coated by a coating film made of a light transmittable material in an encapsulating manner according to an example embodiment of the present invention.

Referring to FIG. 12, an emulsion type medium 1220 in which colloidal particles 1210 having electric charge or magnetic properties are dispersed, may be prepared, followed by enclosing the same in a capsule film 1230 made of a light transmittable material, thus fabricating a capsule product (a shell type capsule).

Figure 13:
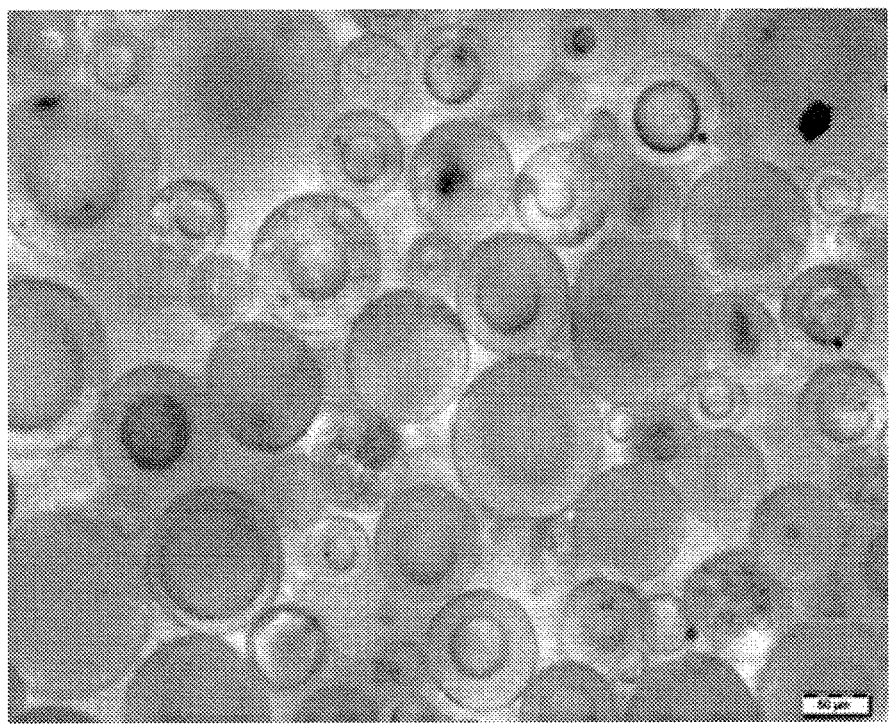
FIGS. 13 and 14 illustrate a practical example of a capsule including a colloidal particle-containing medium according to an example embodiment of the present invention.
Figure 14:
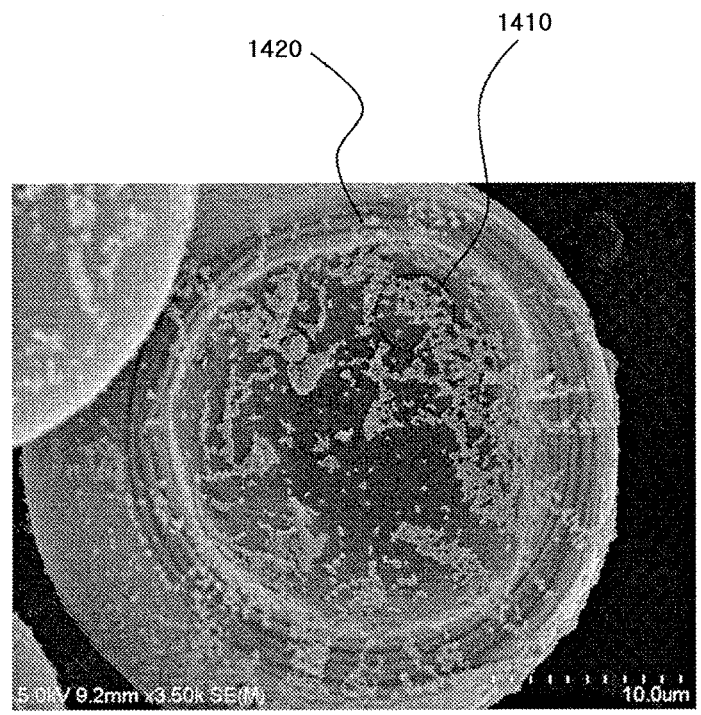

FIGS. 13 and 14 illustrate a practical example of a capsule including a colloidal particle-containing medium according to an example embodiment of the present invention.

Referring to FIG. 13, it can be seen that mediums containing colloidal particles dispersed therein are enclosed by capsule films respectively and formed into a plurality of capsules. In addition, FIG. 14 is an enlarged view showing a capsule prepared according to an example embodiment of the present invention and clearly exhibits that each colloidal particle 1410 is encapsulated by a capsule film 1420. According to an exemplary example embodiment of the present invention, colloidal particles may comprise an $FeO_x$ cluster coated with a charge layer, the medium(s) may comprise UV curable materials, and the light transmittable material may comprise PDMS.

As described above, the medium encapsulated according to an example embodiment of the present invention may have advantages in that: direct interference, e.g., miscibility between colloidal particles encapsulated by different capsules may be prevented; and inter-particle distances of colloidal particles in a printing medium may be independently controlled on a basis of capsules, in turn expressing more fine structural colors of the printing medium. In addition, an encapsulating process of a printing medium according to an example embodiment of the present invention may have advantages in that, even though some regions of the medium are damaged, other regions may function normally. Therefore, only the damaged regions may be dealt with and recovered, thereby enabling effective and easy repair and maintenance of the printing medium.

Meanwhile, a printing medium according to an example embodiment of the present invention may further include a protective member to isolate a medium as well as colloidal particles dispersed in the medium from external environments, wherein the protective member is formed on the medium.

Figure 15:
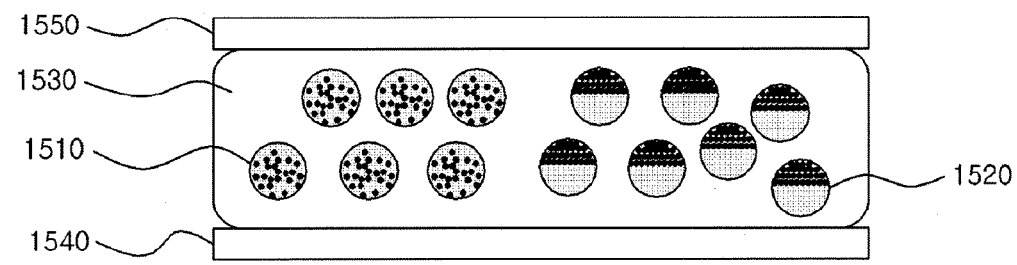
FIG. 15 illustrates a configuration of a printing medium including a protective member according to an example embodiment of the present invention.

FIG. 15 illustrates a configuration of a printing medium including a protective member according to an example embodiment of the present invention.

Referring to FIG. 15, a printing medium 1500 according to the example embodiment of the present invention may have media 1510 and 1520 which are dispersed in a light transmittable material 1530 and in which colloidal particles are dispersed, and a protective member 1550 formed on the light transmittable material 1530, so as to isolate the media 1510 and 1520 as well as the colloidal particles dispersed in the media, from the external environment.

More particularly, the protective member 1550 according to an exemplary example embodiment of the present invention may function to isolate the media 1510 and 1520 from external environments including, for example, air, water, etc., therefore, inter-particle distances of colloidal particles in the media in a fixed state (e.g., a solid phase, a cured state, etc.) are independent of external environments and thus constantly maintained. The protective member 1550 according to the example embodiment of the present invention may include a light transmittable polymer material, without being particularly limited thereto. Such material may be suitably altered or varied, provided that it can accomplish the purposes of the present invention.

Figure 16:
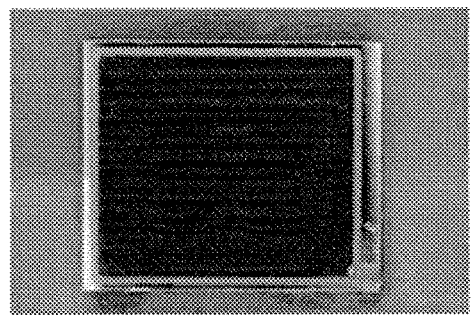
FIG. 16 illustrates various information embodied on a printing medium according to an example embodiment of the present invention.
Figure 16:
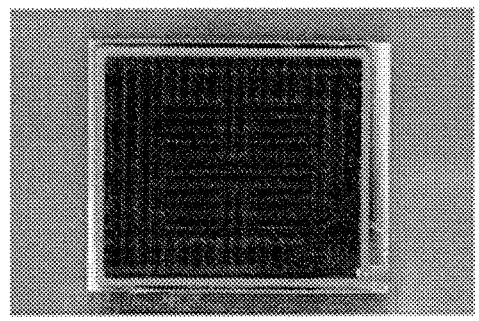
Figure 16:
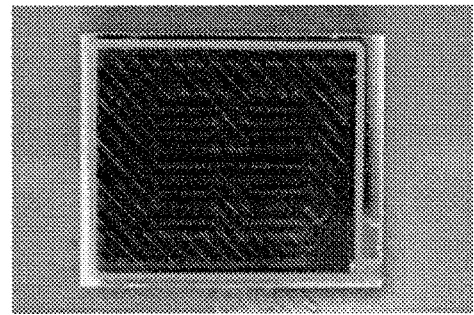

FIG. 16 illustrates various information embodied on a printing medium according to an example embodiment of the present invention. For reference, according to the example embodiment illustrated in FIG. 11, the colloidal particle is an $FeO_x$ cluster coated with a silicon oxide ($SiO_x$) charge layer, while the medium is a material cured by UV irradiation. Referring to FIG. 16, it can be seen that the medium according to an example embodiment of the present invention may embody various patterns of structural colors depending upon applied electric field or magnetic field.

Figure 17:
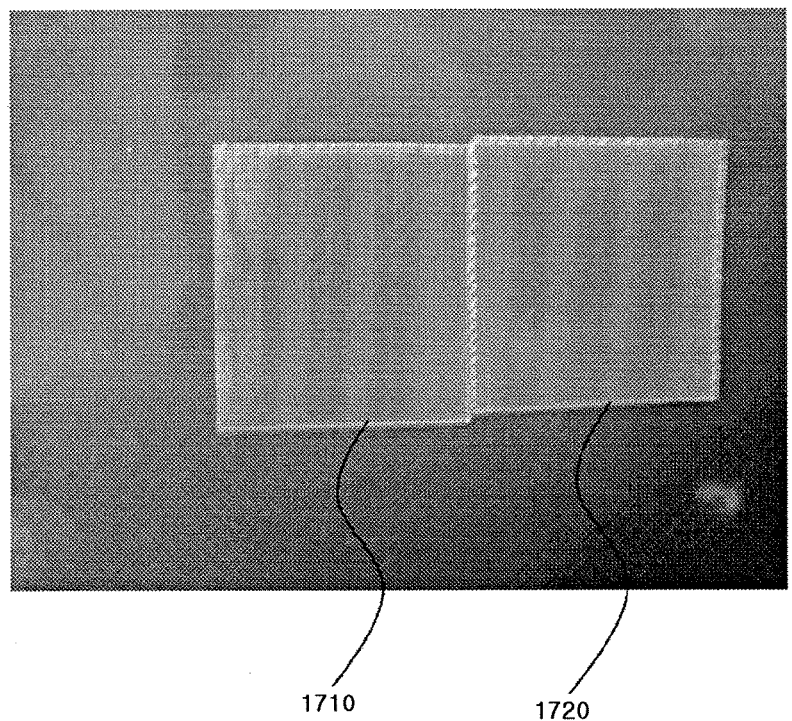
FIGS. 17 and 18 show test results of a printing medium including a protective member according to an example embodiment of the present invention, compared to another printing medium without the protective member.
Figure 18:
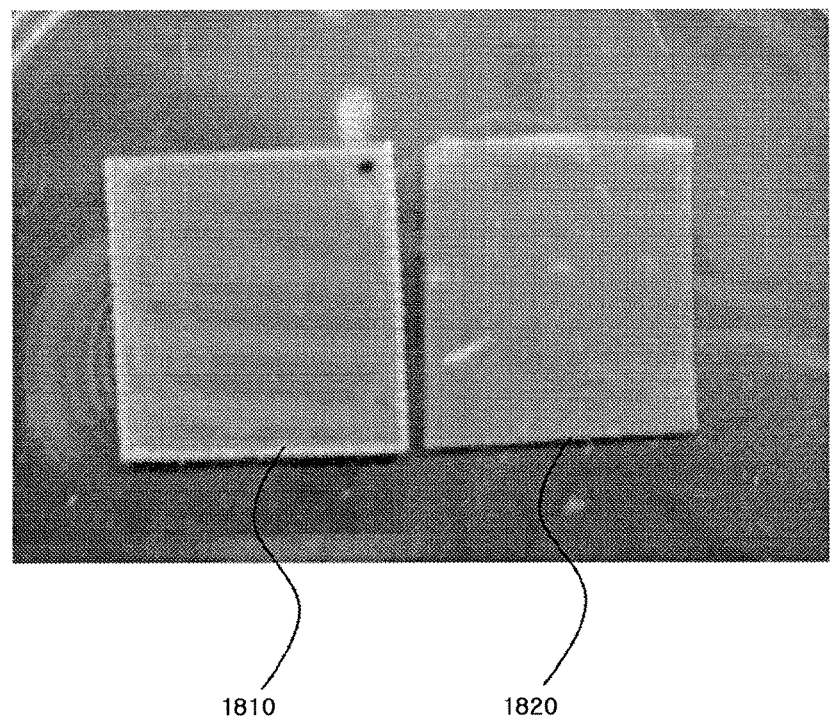

FIGS. 17 and 18 show test results of a printing medium including a protective member according to an example embodiment of the present invention, compared to another printing medium without the protective member. For reference, according to example embodiments illustrated in FIGS. 17 and 18, the colloidal particle is an $FeO_x$ cluster coated with a silicon oxide ($SiO_x$) charge layer, the medium is a phase-changeable material depending upon variation in temperature, and the protective member is a light transmittable polymer film.

First, FIG. 17 illustrates test results obtained immediately after the structural color in a desired pattern was expressed by applying a magnetic field to a printing medium 1710 including a protective member according to an exemplary example embodiment of the present invention and another printing medium 1720 without a protective member, respectively, and then, the expressed color was fixed by removing application of energy. Referring to FIG. 17, it was confirmed that, just after the structural color was expressed and fixed, the structural color was normally maintained in both the printing medium 1710 including the protective member and the printing medium 1720 without the protective member.

Next, FIG. 18 illustrates test results obtained 48 hours after the structural color in a desired pattern was expressed and fixed on a printing medium 1810 including a protective member according to an exemplary example embodiment of the present invention and another printing medium 1820 without a protective member, respectively. Referring to FIG. 18, it was confirmed that the printing medium 1810 having the protective member has retained a structural color relatively closer to the initially expressed one. On the other hand, the printing medium 1820 without the protective member neither maintained initially embodied structural color nor expressed any structural color.

As is apparent from the foregoing description, the protective member according to an example embodiment of the present invention may isolate the medium in which particles are dispersed, from external environments, to thereby constantly maintain inter-particle distances of the particles even after a long time.

Meanwhile, according to an example embodiment of the present invention, a printing medium may further include an electrode or magnetic pole mounted on either or both sides of the printing medium, in order to apply an electric field or a magnetic field to the printing medium. Specifically, for the printing medium having a protective member, the protective member may concurrently implement isolation of the medium from external environments as well as application of the electric field or magnetic field thereto. For instance, such a protective member may comprise indium tin oxide (ITO) as a light transmitting electrode material.

Figure 19:
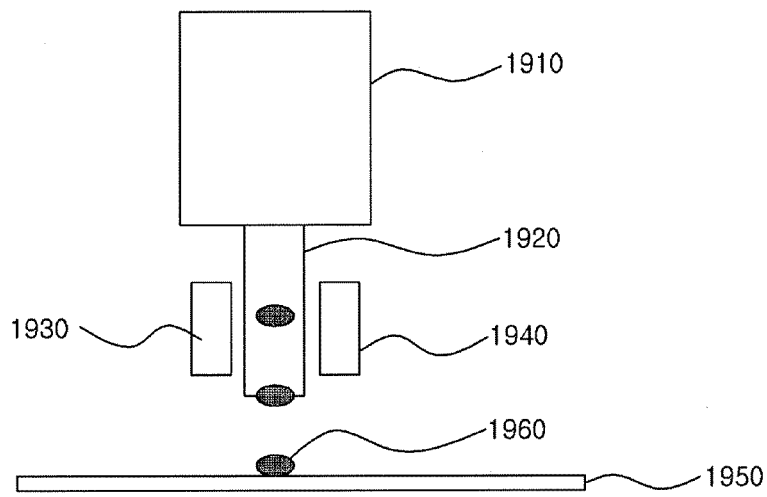
FIG. 19 illustrates a configuration of a printing apparatus according to an example embodiment of the present invention.

FIG. 19 illustrates a configuration of a printing apparatus according to an example embodiment of the present invention. Referring to FIG. 19, a printing apparatus 1900 according to the example embodiment of the present invention may execute injection of a medium 1960 containing colloidal particles to a subject to be printed 1950, wherein the injected medium 1960 is subjected to application of an electric field or a magnetic field in order to control inter-particle distances of colloidal particles, and also is subjected to energy application or blocking of the energy application in order to change the medium 1960 into a fixed state, thereby fixing the controlled inter-particle distances of the colloidal particles in the medium 1960. As a result, the medium 1960 adsorbed onto the subject 1950 may stably reflect light at specific wavelengths.

Referring to FIG. 19, the printing apparatus 1900 according to the example embodiment of the present invention may include a storage part 1910, an injection part 1920, an electromagnetic field generating and/or applying unit 1930, an energy applying and/or controlling unit 1940 and a controller (not shown).

The storage part 1910 according to the example embodiment of the present invention may store the medium including charged colloidal particles dispersed therein.

The injection part 1920 according to the example embodiment of the present invention may inject the medium 1960 containing the colloidal particles in a droplet form toward the subject 1950.

The electromagnetic field generating and/or applying unit 1930 according to the example embodiment of the present invention may apply an electric field or a magnetic field to the injected medium 1960, so as to control inter-particle distances of the colloidal particles in the medium 1960.

The energy applying and/or controlling unit 1940 according to the example embodiment of the present invention may apply energy (e.g., heat, light, electricity, magnetic energy, mechanical energy, chemical energy, etc.) to the injected medium 1960 or block such energy application in order to change the medium 1960 into a fixed state (e.g., a solid phase, a cured state, etc.), thereby fixing the inter-particle distances of the colloidal particles in the medium 1960.

Finally, the controller (not shown) according to the example embodiment of the present invention may control individual functions of the storage part 1910, the injection part 1920, the electromagnetic field generating and/or applying unit 1930 and the energy applying and/or controlling unit 1940, to thereby correctly express specific structural colors at specific regions, corresponding to conditions of the subject of printing 1950.

Figure 20:
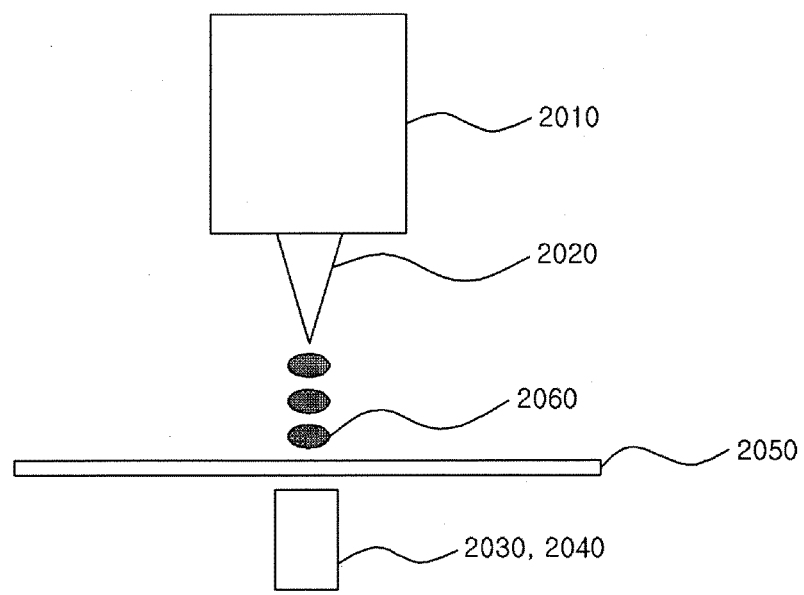
FIG. 20 illustrates a configuration of a printing apparatus according to another example embodiment of the present invention.

FIG. 20 illustrates the configuration of a printing apparatus 2000 according to another example embodiment of the present invention. Referring to FIG. 20, the printing apparatus 2000 according to another example embodiment of the present invention may include a storage part 2010, an injection part 2020, an electromagnetic field generating and/or applying unit 2030, an energy applying and/or controlling unit 2040 and a controller (not shown). Specifically, for the printing apparatus 2000 according to this example embodiment of the present invention, the electromagnetic field generating and/or applying unit 2030 and the energy applying and/or controlling unit 2040 may be mounted below a subject of printing 2050.

First, the injection part 2020 according to the example embodiment of the present invention may inject the medium 2060 containing colloidal particles in a droplet form toward the subject 2050.

The electromagnetic field generating and/or applying unit 2030 according to the example embodiment of the present invention may apply an electric field or a magnetic field to the medium 2060, which was injected by the injection part 2020 and adhered to the subject 2050, so as to control inter-particle distances of the colloidal particles in the medium 2060.

The energy applying and/or controlling unit 2040 according to the example embodiment of the present invention may apply energy or block the energy application to the medium 2060, which was injected by the injection part 2020 and adhered to the subject 2050, so as to fix the inter-particle distances of the colloidal particles in the medium 2060.

Other configurations of the printing apparatus 2000 illustrated in FIG. 20 are substantially similar or equal to those of the printing apparatus 1900 shown in FIG. 19, therefore, a detailed description thereof will be omitted.

As described above, a printing apparatus according to the present invention may enable full color printing of information onto a subject using only one material, without using a plurality of pigments (e.g., ink, toner, etc.) to express various colors.

As such, although preferred example embodiments of the present invention have been described with reference to accompanying the drawings to explain technical configurations and effects of the present invention, such example embodiments were proposed for illustrative purposes to more clearly understand the present invention and the present invention is not particularly restricted thereto. It will be appreciated by those skilled in the art to which the present invention pertains that various alterations and modifications are possible from the foregoing description.

Accordingly, the scope and spirit of the present invention are not limited to such example embodiments described above, and subject matter disclosed in the appended claims and modifications, variations and equivalents thereof will be construed as being included within the scope of the present invention.

What is claimed is:

1. A printing medium comprising a medium containing numerous charged particles dispersed therein, wherein inter-particle distances of the particles in the medium are controlled by applying at least one of an external electric field or an external magnetic field to the medium; wherein the inter-particle distances of the particles are fixed by applying energy to the medium; and wherein the medium includes a reversible phase-change material by applying energy thereto.

2. The printing medium according to claim 1, wherein the energy includes at least one selected from heat energy, light energy and chemical energy.

3. The printing medium according to claim 1, wherein the inter-particle distances of the particles are altered depending upon variation in at least one of intensity or orientation of the external electric field, and a wavelength of light reflected from the particles is varied depending upon the alterations of the inter-particle distances.

4. The printing medium according to claim 1, wherein the inter-particle distances of the particles are altered depending upon variation in at least one of intensity or orientation of the external magnetic field, and a wavelength of light reflected from the particles is varied depending upon the alterations of the inter-particle distances.

5. The printing medium according to claim 1, wherein the particles are electrically charged as such or have electric charge by varying characteristics of the particles.

6. The printing medium according to claim 1, wherein the particles comprise at least one selected from Fe, Co and Ni.

7. The printing medium according to claim 1, wherein the medium is dispersed in a light transmittable material.

8. The printing medium according to claim 1, further comprising a protective member formed on the medium to isolate the medium from external environments.

9. A printing method comprising:
  injecting a medium, in which numerous charged particles are dispersed;
  applying at least one of an external electric field or an external magnetic field to the medium to control inter-particle distances of the particles; and
  applying energy to the medium to fix the inter-particle distances of the particles, wherein the medium includes a reversible phase-change material by applying energy thereto.

10. The printing method according to claim 9, wherein the energy includes at least one selected from heat energy, light energy and chemical energy.

11. The printing method according to claim 9, wherein the inter-particle distances of the particles are altered depending upon variation in at least one of intensity or orientation of the external electric field, and a wavelength of light reflected from the particles is varied depending upon the alterations of the inter-particle distances.

12. The printing method according to claim 9, wherein the inter-particle distances of the particles are altered depending upon variation in at least one of intensity or orientation of the external magnetic field, and a wavelength of light reflected from the particles is varied depending upon the alterations of the inter-particles distances.

13. The printing method according to claim 9, wherein the particles are electrically charged as such or have electric charge by varying characteristics of the particles.

14. The printing method according to claim 9, wherein the particles comprise at least one selected from Fe, Co and Ni.

15. The printing method according to claim 9, wherein at least one of the external electric field or the external magnetic field is applied to the medium after the medium is adhered to a subject of printing.

16. A printing apparatus comprising:
  an injector to inject a medium, in which numerous charged particles are dispersed;
  an electromagnetic field generating unit to generate at least one of an electric field or a magnetic field applied to the medium; and
  an energy controlling unit to generate energy applied to the medium,
  wherein at least one of the electric field and the magnetic field generated in the electromagnetic field generating unit is applied to the medium to control inter-particle distances of the particles in the medium; wherein the energy generated in the energy controlling unit is applied to the medium to fix the inter-particle distances of the particles; and wherein the medium includes a reversible phase-change material by applying energy thereto.

17. The printing apparatus according to claim 16, wherein the energy includes at least one selected from heat energy, light energy and chemical energy.

18. The printing apparatus according to claim 16, wherein the inter-particle distances of the particles are altered depending upon variation in at least one of intensity or orientation of the electric field generated in the electromagnetic field generating unit, and a wavelength of light reflected from the particles is varied depending upon the alterations of the inter-particle distances.

19. The printing apparatus according to claim 16, wherein the inter-particle distances of the particles are altered depending upon variation in at least one of intensity or orientation of the magnetic field generated in the electromagnetic field generating unit, and a wavelength of light reflected from the particles is varied depending upon the alterations of the inter-particles distances.

20. The printing apparatus according to claim 16, wherein the electromagnetic field generating unit generates at least one of the electric field or the magnetic field to the medium after the medium is adhered to a subject of printing.

21. A printing medium comprising a medium containing numerous charged particles dispersed therein, wherein inter-particle distances of the particles in the medium are controlled by applying energy as well as at least one of an external electric field or an external magnetic field to the medium; and wherein the inter-particle distances of the particles are fixed by blocking the energy to the medium.

22. The printing medium according to claim 21, wherein the medium includes at least one selected from a reversible phase-change material and an irreversible curing material.

23. The printing medium according to claim 21, wherein the energy includes at least one selected from heat energy, light energy and chemical energy.

24. The printing medium according to claim 21, wherein the inter-particle distances of the particles are altered depending upon variation in at least one of intensity or orientation of the external electric field, and a wavelength of light reflected from the particles is varied depending upon the alterations of the inter-particle distances.

25. The printing medium according to claim 21, wherein the inter-particle distances of the particles are altered depending upon variation in at least one of intensity or orientation of the external magnetic field, and a wavelength of light reflected from the particles is varied depending upon the alterations of the inter-particle distances.

26. The printing medium according to claim 21, wherein the particles are electrically charged as such or have electric charge by varying characteristics of the particles.

27. The printing medium according to claim 21, wherein the particles comprise at least one selected from Fe, Co and Ni.

28. The printing medium according to claim 21, wherein fixation of the inter-particle distances of the particles is released by applying energy to the medium.

29. The printing medium according to claim 21, wherein the medium is dispersed in a light transmittable material.

30. The printing medium according to claim 21, further comprising a protective member formed on the medium to isolate the medium from external environments.

31. A printing method comprising:
injecting a medium, in which numerous charged particles are dispersed;
applying energy as well as at least one of an external electric field or an external magnetic field to the medium to control inter-particle distances of the particles; and
blocking the energy to the medium to fix the inter-particle distances of the particles.

32. The printing method according to claim 31, wherein the medium includes at least one selected from a reversible phase-change material and an irreversible curing material.

33. The printing method according to claim 31, wherein the energy includes at least one selected from heat energy, light energy and chemical energy.

34. The printing method according to claim 31, wherein the inter-particle distances of the particles are altered depending upon variation in at least one of intensity or orientation of the external electric field, and a wavelength of light reflected from the particles is varied depending upon the alterations of the inter-particle distances.

35. The printing method according to claim 31, wherein the inter-particle distances of the particles are altered depending upon variation in at least one of intensity or orientation of the external magnetic field, and a wavelength of light reflected from the particles is varied depending upon the alterations of the inter-particles distances.

36. The printing method according to claim 31, wherein the particles are electrically charged as such or have electric charge by varying characteristics of the particles.

37. The printing method according to claim 31, wherein the particles comprise at least one selected from Fe, Co and Ni.

38. The printing method according to claim 31, wherein at least one of the external electric field or the external magnetic field is applied to the medium after the medium is adhered to a subject of printing.

39. A printing apparatus comprising:
an injector to inject a medium, in which numerous charged particles are dispersed;
an electromagnetic field generating unit to generate at least one of an electric field or a magnetic field applied to the medium; and
an energy controlling unit to generate energy applied to the medium and block the energy thereto,
wherein the energy generated in the energy controlling unit as well as at least one of the electric field and the magnetic field generated in the electromagnetic field generating unit are applied to the medium to control inter-particle distances of the particles; and wherein the energy controlling unit blocks the energy to the medium to fix the inter-particle distances of the particles.

40. The printing apparatus according to claim 39, wherein the energy includes at least one selected from heat energy, light energy and chemical energy.

41. The printing apparatus according to claim 39, wherein the inter-particle distances of the particles are altered depending upon variation in at least one of intensity or orientation of the electric field generated in the electromagnetic field generating unit, and a wavelength of light reflected from the particles is varied depending upon the alterations of the inter-particle distances.

42. The printing apparatus according to claim 39, wherein the inter-particle distances of the particles are altered depending upon variation in at least one of intensity or orientation of the magnetic field generated in the electromagnetic field generating unit, and a wavelength of light reflected from the particles is varied depending upon the alterations of the inter-particles distances.

43. The printing apparatus according to claim 39, wherein the electromagnetic field generating unit generates at least one of the electric field or the magnetic field to the medium after the medium is adhered to a subject of printing.

* * * * *